Nov. 19, 1968    F. A. LUDEWIG, JR    3,412,324
OPTICAL MAGNETOMETER BASED ON THE PRINCIPLE OF FRUSTRATED
TOTAL INTERNAL REFLECTION OF LIGHT
Filed Aug. 24, 1966
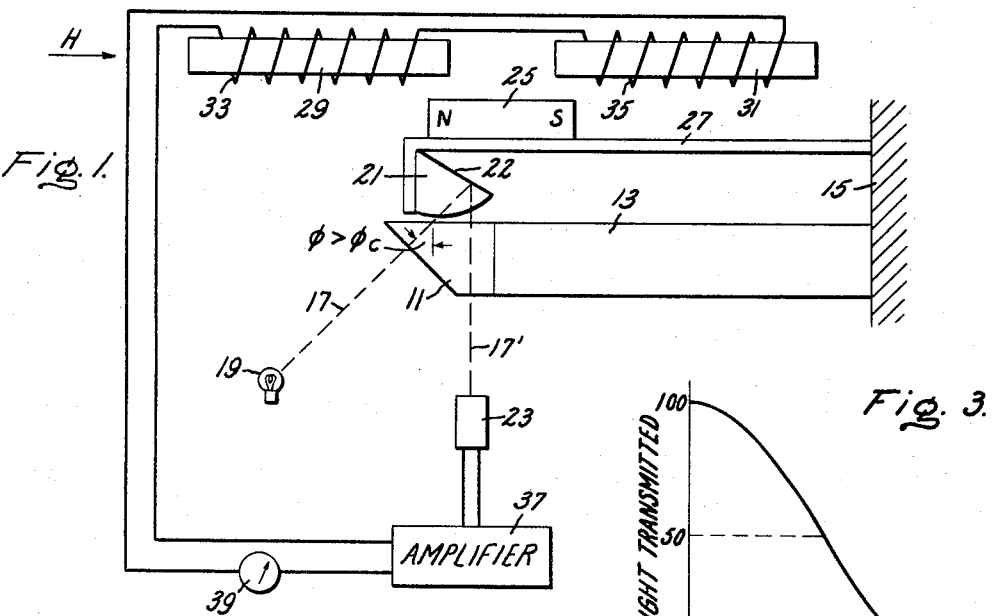
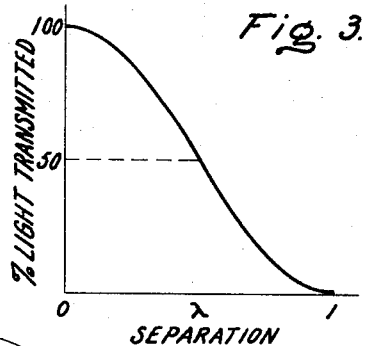
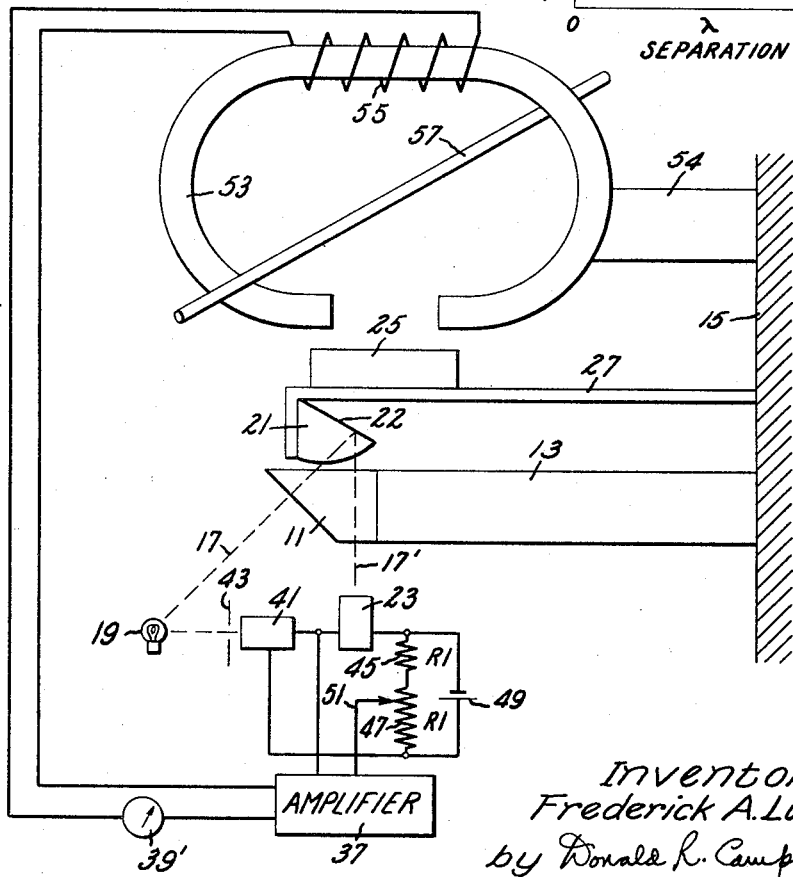
Inventor:
Frederick A. Ludewig, Jr.
by Donald R. Campbell
His Attorney.

United States Patent Office 3,412,324
Patented Nov. 19, 1968

3,412,324
OPTICAL MAGNETOMETER BASED ON THE PRINCIPLE OF FRUSTRATED TOTAL INTERNAL REFLECTION OF LIGHT
Frederick A. Ludewig, Jr., Ballston Spa, N.Y., assignor to General Electric Company, a corporation of New York
Filed Aug. 24, 1966, Ser. No. 574,762
8 Claims. (Cl. 324—43)

This invention relates to a magnetometer for measuring the magnitudes and polarities of magnetic fields, and more particularly to a magnetometer based on the principle of frustrated total internal reflection of light.

Total internal reflection of an incident light beam by an optical element such as a prism is a well known concept and occurs when the angle of incidence exceeds a critical angle whose value is dependent on the indices of refraction of the prism and the medium, normally air, adjacent the prism. Incident rays lying within the critical angle are transmitted through the prism into the air while those rays which exceed the critical angle are totally internally reflected at the prism interface. The frustration of total internal reflection occurs when a second optical element having an index of refraction similar to that of the prism is placed immediately adjacent the prism interface, and since the ratio of indices of refraction is now changed, rays which were formerly totally internally reflected are now transmitted. It has also been observed that when the separation of the second optical element from the prism interface is less than about one wavelength (of the incident light), there is a variation in the amount of light transmitted by the second element dependent on the amount of separation. Thus for zero separation all the incident light is transmitted while for one wavelength separation very little or none of the light is transmitted depending on the angle of incidence of the incident ray. For separations between zero and about one wavelength there is in general a continuous decrease in the amount of light transmitted as the separation increases.

In a preferred embodiment of a magnetometer, the principle of frustrated total internal reflection is applied by mounting a first optical element such as a prism and a second optical element for movement with respect to one another within the range of zero to about one wavelength of incident light. The second optical element preferably has a curved surface and is movably mounted with respect to the prism interface, and has an initial or zero external field position. Incident light rays directed at the prism at an angle greater than the critical angle are in general partially transmitted through the movable optical element in dependence on the amount of separation of the elements. A magnet is attached to the movable optical element. The magnet is in proximity to the poles of flux concentrating means for the external field being measured. Surrounding the flux concentrating means are windings which are supplied with current whose value is dependent on the output from a photodetector for detecting the amount of light transmitted by the movable optical element. Placing the instrument in an external field to be measured causes the poles of the flux concentrating means to assume the proper polarity and repel or attract the magnet, thereby changing the separation of the movable optical element from the fixed element and varying the amount of light transmitted. The photodetector senses the change in light and generates a current which is impressed on the windings of the flux concentrating means to cancel the external field and tend to cause the magnet and second optical element to return to its initial or zero external field position. In the steady state the second optical element and magnet are displaced from the initial position by a small error position which is proportional to the strength of the field being measured. The current then flowing is a measure of the external magnetic field, and can be positive or negative depending on the polarity of the external field. In a modification, the flux concentrating means assumes a different form to facilitate measurement of the current flowing in a wire. The magnetometer can also be used to measure A.C. fields.

Accordingly, an object of the invention is to provide a new and improved magnetometer based on the principle of the frustration of total internal reflection of light.

Another object is the provision of such a magnetometer which is relatively inexpensive, which gives an indication of the polarity of the field being measured as well as its strength or magnitude, and which can be used to measure both unidirectional and A.C. fields.

Yet another object is to provide a new and improved magnetometer of the foregoing type capable of being used to measure the magnitude and direction of current in a wire.

The foregoing and other objects, features and advantages of the invention will be apparent from the following more particular description of the several preferred embodiments thereof, as illustrated in the accompanying drawing wherein:

FIG. 1 is a schematic side view of the apparatus according to the invention, the associated circuitry likewise being shown schematically;

FIG. 2 is a view similar to FIG. 1 of a modification of the invention useful in measuring current in a wire, and showing a modification of the circuitry for giving an indication of the polarity of the magnetic field being measured, and FIG. 3 is a graph illustrating a typical curve of percentage of light transmitted due to frustrated total internal reflection for separations of the optical elements of 0 to 1 wavelength.

In FIG. 1, a first optical element 11 preferably in the form of a prism is fixedly mounted within the instrument as for instance by being secured to a cantilever bar 13 which is fastened at its other end to a side support 15. Incident rays 17 from a stationary light source 19 pass through the prism and strike the upper surface at an angle $\phi$ which is greater than the critical angle $\phi_c$ at which the incident ray is totally internally reflected within the prism. The critical angle $\phi_c$ can be calculated from Snell's Law and is dependent on the ratio of the indices of refraction of the prism and of the medium, in this case air, into which the incident light ray would be transmitted in the absence of total internal reflection. Assuming that the prism 11 is made of glass having an index of refraction of about 1.5 to 1.8, the critical angle $\phi_c$ is in the range of about 32° to 42°.

The frustration of total internal reflection occurs when a second optical element 21 having an index of refraction similar to that of prism 11 is moved into contact with the interface surface of prism 11 at the point at which the incident ray 17 strikes, or within about one wavelength (of the incident light) from this surface. In this case the incident light ray 17, even though at an angle greater than the critical angle, is transmitted totally or partially through the second optical element 21 rather than being totally internally reflected within the prism 11. The explanation for this effect, which is known in classical optics, is probably that it takes the ray 17 at least one wavelength to realize that it is in a different medium having a different index of refraction.

To avoid the necessity of having optical flats at the adjacent surfaces of the optical element 11 and 21, the second element 21 has a curved lower surface whose low point is adjacent the prism 11 at the point at which the incident ray 17 emerges. This curved surface is more conveniently spherical rather than cylindrical. The second optical element 21 is further movably mounted with respect to the first element 11 to vary the distance or separation between the two elements within the range of 0 to about 1 wavelength of the incident light. As the separation is increased within this range, the amount of light transmitted continuously decreases in accordance with a curve for instance as shown in FIG. 3, where the angle $\phi$ of the incident ray is only somewhat greater than the critical angle $\phi_c$. As the angle of incidence increases there are a family of similar curves whose slope becomes increasingly more steep. It is observed in FIG. 3 that for a particular separation of the optical elements 11 and 21 within the range of 0 to 1 wavelength, a particular percent or amount of the light is transmitted. In accordance with the invention, this phenomenon is the basis for the measurement of magnitude and polarity of magnetic fields. The amount of light transmitted through the second optical element 21 is detected and is a function of the separation of the two elements 11 and 21. As will be shown, the magnitude and polarity of the external magnetic field being measured is proportional to the separation within the range of 0 to about 1 wavelength. It will be understood, of course, that the optical elements as shown in FIG. 1 can be rearranged to produce the same results, as for instance by interchanging the prism and the optical element having the curved surface.

The transmitted portion of ray 17 is detected preferably by a photodetector 23 which produces a current in proportion to the amount of light impinging on it. In order that the photodetector 23 and light source 17 may be arranged on the same side of the instrument, the upper surface 22 of the second or movable optical element 21 is conveniently angled and silvered to produce the reflected ray 17' which as illustrated passes through the fixed prism 11 before arriving at photodetector 23. A magnet 25, preferably a permanent magnet, is secured for displacement with the movable optical element 21, the entire assembly being suitably mounted so as to have an initial or zero external field position at a particular separation of the two elements 11 and 21, and preferably having movement in either direction from the zero or no external field position. This is conveniently achieved by securing a side of the optical element 21 to a yieldable L-shaped cantilever beam 27. The fixed end of beam 27 is fastened to side support 15 while the permanent magnet 25 is secured to the top of the free end of the beam.

Flux concentrators 29 and 31 for the external field H being measured are fixedly mounted within the instrument to provide a pair of spaced poles lying in proximity to the poles of the permanent magnet 25. As shown in FIG. 1, the flux concentrators 29 and 31 are separate bars of a suitable ferro-magnetic material such as iron and are mounted colinear with respect to one another. Surrounding the flux concentrators 29 and 31 are respective windings 33 and 35 which are in the same direction and, as will become more clear, are used to cancel the external field. The windings 33 and 35 are connected in series and are coupled to an amplifier 37 which provides gain for the output of photodetector 23. A meter 39 which is essentially an ammeter is located in the output leads from amplifier 37, and is graduated in units of magnetic field strength or intensity since when reading a measurement the amplifier output current is a measure of the external magnetic field.

In the simplest situation, which will be useful in explaining the principles of operation of the magnetometer according to the invention, the assembly of movable optical element 21 and permanent magnet 25 have an initial or zero external field position wherein the separation of the optical elements 21 and 11 is about one wavelength of incident light. Thus incident ray 17 is totally or almost totally internally reflected by the prism 11 and (see FIG. 3) there is little or no light transmitted through the movable optical element 21. Upon placing the magnetometer in an external magnetic field H to be measured, the poles of the flux concentrators 29 and 31 assume the appropriate polarity and exert a force on the permanent magnet causing the movable optical element 21 to change its separation from the fixed prism 11. Let it be assumed that the external field H is of a polarity such that the flux concentrator 29 has a north pole adjacent the north pole of permanent magnet 25 while the flux concentrator 31 has a south pole adjacent the south pole of the magnet. In this case the permanent magnet 25 is repelled and optical element 21 moves closer to the fixed prism 11. The frustration of total internal reflection of the incident light ray 17 by fixed prism 11 occurs, and in accordance with FIG. 3 a portion of the incident ray is transmitted through element 21 and is reflected by silvered surface 22 and detected by photodetector 23. The proportional output current from amplifier 37 is adjusted so that when impressed on the windings 33 and 35, an opposing or bucking magnetic field is produced within the flux concentrator 29 and 31 to cancel the external field. The assembly of permanent magnet 25 and movable optical element 21 tends to return to its initial position, but in a steady state condition are displaced from this precise initial or zero external field position by a small error which is dependent on the system parameters. In practice this error is chosen to be negligible. The amplifier output current as indicated by the meter 39 when the steady state error position is achieved is then a measure of the magnitude or strength of the external magnetic field, since the difference between the error position and the initial position is proportional to the strength of the external field. As has been pointed out, the meter 39 is graduated in terms of magnetic field units. A sensitivity of the order of $10^{-3}$ oersteds is achievable using a magnetometer as herein described.

The light detector arrangement shown in FIG. 2 is preferred since it is capable of giving an indication of the polarity of the external magnetic field as well as its magnitude. A second photodetector 41 is directed toward the light source 19 and has an apertured shield 43 to admit for instance only 50% of the light. One terminal of each of the photodetectors 41 and 23 are connected together and to the amplifier 37. The other terminal of each photodetector are respectively connected to either end of a bridge branch comprising fixed resistance 45 and variable resistance 47 which are connected together in series and across battery 49. Movable tap 41 of variable resistance 47 is connected to the other terminal of amplifier 37 and is adjusted so that there are equal resistances R1 in one branch of this bridge. The instrument is adjusted so that in the initial or zero external field position of the assembly of permanent magnet 25 and movable optical element 21, the separation in accordance with FIG. 3 (for the example in which photodetector 41 receives 50% of the light) is such that 50% of the light is transmitted and detected by photodetector 23. Upon placing the instrument in an external field of either polarity, the amount of light transmitted varies according to the curve shown in FIG. 3 according to whether the permanent magnet 25 is attracted or repelled. The potetnial at tap 51 thus swings positive or negative, and meter 39 detects either a positive or negative current according to the polarity of the field being measured.

In FIG. 2 the flux concentrator 53 takes the form of a C having poles in proximity to the poles of the permanent magnet 25 and is attached to the support 15 by a bar 54. A single winding 55 is wound about flux concentrator 53 and is connected across the terminals of amplifier 37. This form of flux concentrator is useful in measuring the magnetic field about a current carrying wire 57. Since the magnetic field is proportional to the current flowing through the wire and the direction of the current, the meter 39' is calibrated as an ammeter. The magnetometer now becomes a clip-on type D.C. ammeter. In operation, the negative or positive current produced at the output of the terminals of amplifier 37 in the manner already described when the steady state error position is achieved is impressed on the winding 55 to produce a bucking field within flux concentrator 53 which cancels the external field, i.e. the field produced by wire 57. The current then flowing as measured by meter 39' is indicative of the magnitude and direction of the current in the wire.

Only simple modifications are required to use the magnetometer to measure A.C. magnetic fields, such as replacing the meters 39 and 39' by A.C. ammeters and attending to other obvious electrical and mechanical considerations. In addition to the multiple uses of the magnetometer, it is relatively inexpensive since it is made up of ordinary optical and electrical parts. As has been indicated, the sensitivity is on the order of $10^{-3}$ oersteds. This magnetometer can easily be made to be hand held and battery operated for portable operation.

While the invention has been particularly shown and described with reference to several preferred embodiments thereof, it will be understood by those skilled in the art that various changes in form and details may be made therein without departing from the spirit and scope of the invention.

What I claim as new and desire to secure by Letters Patent of the United States is:

1. A magnetometer comprising
   a fixed optical element and a movable optical element mounted for movement with respect thereto to vary the separation between the elements within the range of zero to about one wavelength of incident light,
   means for directing an incident light ray at one of said optical elements at an angle greater than the critical angle, said ray being transmitted through the other optical element due to the frustration of total internal reflection, the amount of light transmitted decreasing with increased separation of the elements,
   means for detecting the amount of light transmitted through the other optical element and for generating a current dependent thereon,
   means for displacing said movable optical element from an initial position with respect to said fixed optical element by an amount proportional to the magnitude of the external magnetic field being measured, thereby changing the amount of light transmitted and the detected current, and
   means for measuring the current which is indicative of the magnitude of the external magnetic field.

2. A construction as defined in claim 1 wherein said movable optical element is mounted for movement in opposite directions from the initial position, and
   wherein both positive and negative currents are generated,
   whereby the polarity as well as magnitude of the external field are indicated.

3. A construction as set forth in claim 1 wherein one of said optical elements is a prism and wherein the other of said optical elements has a spherical surface whose low point is adjacent the point on the prism at which the incident ray emerges.

4. A magnetometer comprising
   first and second optical elements,
   means for mounting said second optical element for movement with respect to the first optical element to vary the separation between the elements within the range of zero to about one wavelength of incident light,
   means for directing an incident light ray at said first optical element at an angle greater than the critical angle, said ray being transmitted through the second optical element due to the frustration of total internal reflection, the amount of light transmitted decreasing as the separation of the elements is increased,
   a magnet secured to the second optical element for movement therewith,
   flux concentrating means for the external magnetic field being measured, said flux concentrating means having poles in proximity to the poles of the magnet to cause the magnet and second optical element to be displaced in proportion to the magnitude and polarity of the external field,
   means for detecting the amount of light transmitted through the second optical element and for generating a current dependent thereon,
   said current being impressed on windings about the flux concentrating means to produce an opposing field therein which cancels the external magnetic field, and
   means for measuring the current which is proportional to the magnitude and polarity of the external magnetic field.

5. A construction as defined in claim 4 wherein the magnet and movable optical element are yieldably mounted and have a zero external field position at which only a portion of the incident light is being transmitted, so that external fields of opposite polarity cause the amount of light transmitted to respectively increase and decrease.

6. A construction as defined in claim 4 wherein the flux concentrating means for the external field is C-shaped for measuring the magnetic field of a current-carrying wire traversing therethrough, the current measuring means being indicative of the magnitude and direction of current in the wire.

7. A magnetometer comprising
   first and second optical elements and a source of an incident light ray,
   means for fixedly mounting said first optical element and for yieldably mounting the second optical element for movement with respect thereto to vary the separation between the elements within the range of zero to about one wavelength of the incident light,
   said incident ray being directed at said first optical element at an angle greater than the critical angle and being transmitted through the second optical element due to the frustration of total internal reflection, the amount of light transmitted decreasing as the separation of the elements is increased,
   photodetector means for detecting the amount of light transmitted through the second optical element and for generating a current proportional thereto,
   a permanent magnet secured to said second optical element for movement therewith, the assembly of magnet and second optical element having an initial or zero external field position,
   flux concentrating means for the external magnetic field being measured, said flux concentrating means being fixedly mounted and having poles in proximity to the poles of the permanent magnet to cause the assembly to be displaced from the zero external field position in proportion to the magnitude and polarity of the external field, thereby changing the amount of light transmitted by the second optical element and consequently the detected current,
   means for amplifying said current proportional to the displacement of the assembly of said magnet and second optical element, said current being impressed on windings about the flux concentrating means to produce an opposing field therein which cancels the external magnetic field, and means for measuring said current which is indicative of the magnitude and polarity of the external magnetic field.

8. A construction as defined in claim 7 wherein the first optical element is a prism and the second element has a spherical surface whose low point is adjacent the prism at the point at which the incident ray emerges, said permanent magnet and second optical element being mounted on a flexible cantilever bar and having movement in each direction from the zero external field position.

References Cited

UNITED STATES PATENTS 2,312,888   3/1943   Everest _____ 324—43

OTHER REFERENCES

Bergstein, L., A Total Reflection Solid State Optical-Maser Resonator, Proceedings of the IRE, August 1962, p. 1833.

RUDOLPH V. ROLINEC, *Primary Examiner.*

R. J. CORCORAN, *Assistant Examiner.*